United States Patent
Dewan et al.

(10) Patent No.: US 11,734,436 B2
(45) Date of Patent: Aug. 22, 2023

(54) ORGANIC LIGHT EMITTING DIODE (OLED) COMPENSATION BASED ON PROTECTED CONTENT

(71) Applicant: Intel Corporation, Santa Clara, CA (US)

(72) Inventors: Prashant Dewan, Portland, OR (US); Siddhartha Chhabra, Portland, OR (US); Junhai Qiu, Portland, OR (US); Ke Sun, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 17/357,978

(22) Filed: Jun. 25, 2021

(65) Prior Publication Data

US 2021/0319124 A1    Oct. 14, 2021

(51) Int. Cl.
*H04L 29/06* (2006.01)
*G06F 21/62* (2013.01)

(52) U.S. Cl.
CPC .................................... *G06F 21/62* (2013.01)

(58) Field of Classification Search
CPC .............................. G06F 21/32; G06F 21/62
See application file for complete search history.

(56) References Cited

U.S. PATENT DOCUMENTS

| | | | |
|---|---|---|---|
| 7,128,270 B2 | 10/2006 | Silverbrook et al. | |
| 9,868,449 B1 | 1/2018 | Holz et al. | |
| 10,372,196 B2 | 8/2019 | Chauhan et al. | |
| 2003/0090505 A1* | 5/2003 | McGee | H04N 19/179 725/38 |
| 2003/0235304 A1* | 12/2003 | Evans | G06F 21/84 380/216 |
| 2006/0209010 A1 | 9/2006 | Ding et al. | |
| 2011/0156611 A1 | 6/2011 | Tsai | |
| 2011/0285615 A1 | 11/2011 | Rayadurga | |
| 2012/0011575 A1* | 1/2012 | Cheswick | H04L 63/08 726/5 |
| 2012/0075362 A1 | 3/2012 | Ichioka et al. | |
| 2013/0010047 A1 | 1/2013 | Hart | |
| 2014/0043377 A1 | 2/2014 | Tanaka et al. | |
| 2016/0062947 A1 | 3/2016 | Chetlur et al. | |
| 2016/0098115 A1 | 4/2016 | Ren et al. | |

(Continued)

OTHER PUBLICATIONS

Goodfellow, et al. "Adaptive Computation and Machine Learning Series", Book, Nov. 18, 2016, pp. 98-165, Chapter 5, The MIT Press, Cambridge, MA.

(Continued)

*Primary Examiner* — Jason K Gee
(74) *Attorney, Agent, or Firm* — Spectrum IP Law Group LLC

(57) ABSTRACT

Methods and apparatus relating to Organic Light Emitting Diode (OLED) compensation based on protected content are described. In an embodiment, secure memory stores data that is only accessible by trusted logic. Display controller logic circuitry updates pixel values to be stored in the secure memory based on a plurality of frames. The display controller logic circuitry allows access by untrusted software to the updated pixel values after a first number of updates to the pixel values stored in the secure memory. Other embodiments are also disclosed and claimed.

22 Claims, 12 Drawing Sheets

(56) References Cited

U.S. PATENT DOCUMENTS

| | | |
|---|---|---|
| 2016/0111042 A1 | 4/2016 | Pyeon et al. |
| 2016/0189599 A1 | 6/2016 | Lee et al. |
| 2016/0203801 A1 | 7/2016 | De Groot et al. |
| 2016/0210903 A1* | 7/2016 | Jun .......................... G09G 3/20 |

OTHER PUBLICATIONS

Lindholm, et al., "NVIDIA Tesla: A Unified Graphics and Computing Architecture," journal, Mar.-Apr. 2008, pp. 39-55, 0272-1732/08, IEEE Computer Society, Washington D.C.

Nicholas Wilt, "The CUDA Handbook: A Comprehensive Guide to GPU Programming," Jun. 10, 2013, 7 pages, ISBN 0134852745, Pearson Education, New York, NY.

Nicholas Wilt, "The CUDA Handbook; A Comprehensive Guide to GPU Programming", Book, Jun. 22, 2013, pp. 41-57, Addison-Wesley Professional, Boston, MA.

Nvidia, "Nvidia Turing GPU Architecture; Graphics Reinvented," Whitepaper, 2018, 86 pages, WP-09183-001_v01, Nvidia, Santa Clara, CA.

Ross, et al. "Intel Processor Graphics: Architecture & Programming", Power Point Presentation, Aug. 2015, 78 pages, Intel Corporation, Santa Clara, CA.

Shane Cook, "CUDA Programming; A Developer's Guide to Parallel Computing with GPUs," book, 2013, 591 pages, ISBN: 978-0-12-415933-4, Morgan Kaufmann, Waltham, MA.

Shane Cook, "CUDA Programming", Book, 2013, pp. 37-52, Chapter 3, Elsevier Inc., Amsterdam Netherlands.

Stephen Junking, "The Compute Architecture of Intel Processor Graphics Gen9", paper, Aug. 14, 2015, 22 pages, Version 1.0, Intel Corporation, Santa Clara, CA.

\* cited by examiner

| Field | Description |
|---|---|
| TARGET | Target for programming (display engine/OLED compensation logic in the invention) |
| TARGET_DATA | Data (mapping to registers) that needs to be programmed as part of the policy |
| MAC (Message Authentication Code) | MAC over the structure generated by hardware |

FIG. 3

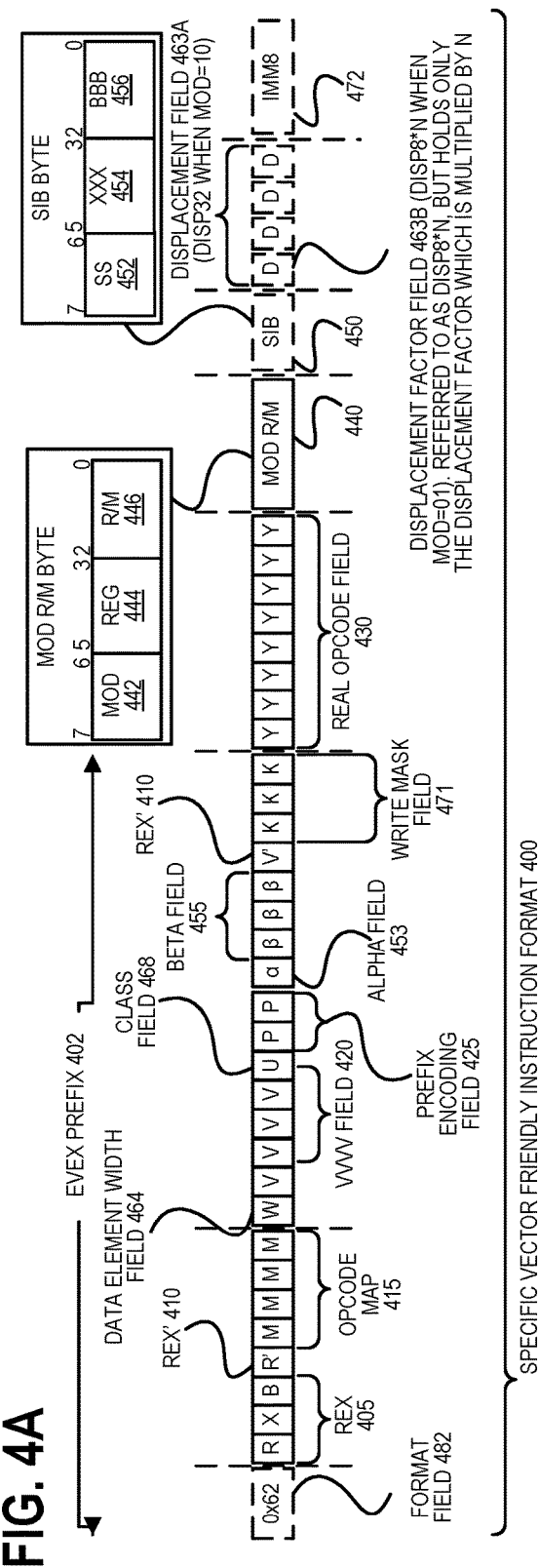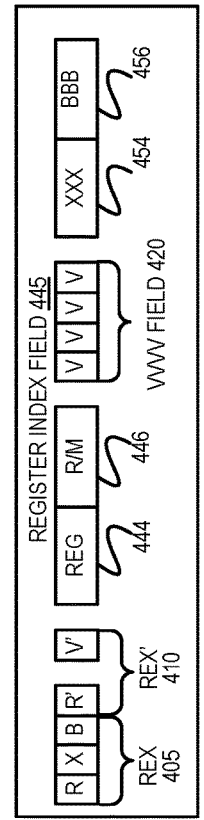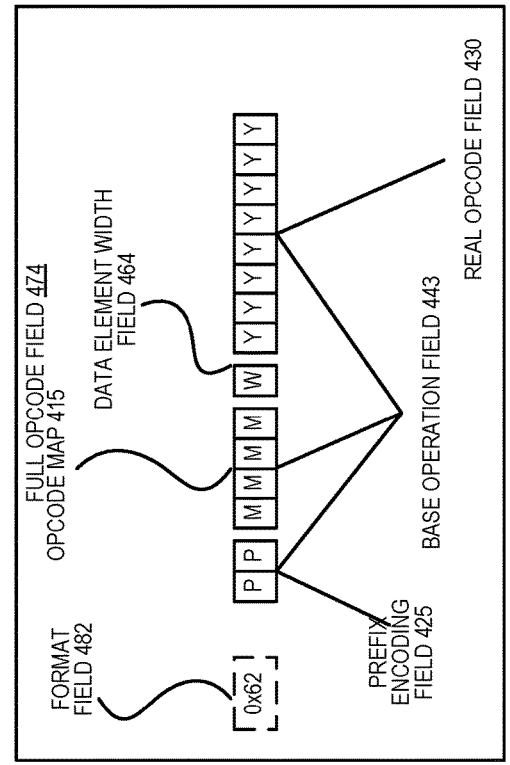

ORGANIC LIGHT EMITTING DIODE (OLED) COMPENSATION BASED ON PROTECTED CONTENT

FIELD

The present disclosure generally relates to the field of electronics. More particularly, an embodiment relates to Organic Light Emitting Diode (OLED) compensation based on protected content.

BACKGROUND

Display panels that are not backlight driven (such as OLED display devices) are quickly gaining popularity, mostly due to their brightness and vibrant color reproduction. OLED display devices are also extremely attractive due to low cost.

OLED display devices use organic material to generate colored pixels. These materials deteriorate with time and the deterioration is non-uniform based on different colors, brightness, etc. This deterioration is attenuated using various OLED compensation schemes. These schemes need access to the pixel data sent to the display over the lifetime of the platform. However, pixel data associated with protected content may not be available to address OLED compensation.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 3 illustrates a sample structure for an instruction accordingly to an embodiment.

FIG. 4A is a block diagram illustrating an exemplary instruction format according to embodiments.

FIG. 4B is a block diagram illustrating the fields of the instruction format that make up the full opcode field according to one embodiment.

FIG. 4C is a block diagram illustrating the fields of the instruction format that make up the register index field according to one embodiment.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, pixel data associated with protected content may not be available to address OLED compensation. Generally, to compensate for deterioration of certain pixels or pixel colors, various compensation algorithms may be used. These algorithms work well when the frames are in unprotected and/or readable by software. However, in a content protection scenario, where the frame contents are not visible to the host software, a compensation algorithm running in an untrusted world does not have access to the pixels of the individual frame. The reason is that providing content access to untrusted access is a breach of the content protection guidelines. Lack of access to the pixels restricts the platform's ability to perform any compensation. This leads to rapid deterioration of the OLED screen, thereby limiting their adoption.

To this end, some embodiments provide one or more techniques to perform OLED compensation based on protected content, e.g., enabling the extended use of OLED displays with content protection. In an embodiment, logic (sometimes referred to herein as "OLED engine") accumulates pixel values (e.g., inside the display controller) using protected memory (which is only accessible to the display controller/logic, and not accessible by untrusted software) and after N accumulations the OLED engine provides the accumulated values to untrusted software. The value of N may be kept a secret. At least one embodiment utilizes more than one secret frame to be included in the accumulated content (i.e., N>1) to prevent untrusted software from sending all but one untrusted frame and thereby recovering the trusted frame from the accumulated values. Further, in one embodiment, one or more new instructions are provided to allow for programming of the OLED compensation logic. In at least some embodiments, one or more of the new instruction(s) discussed herein may follow the EVEX format (such as discussed with reference to FIGS. 4A-4D).

Figure 1:
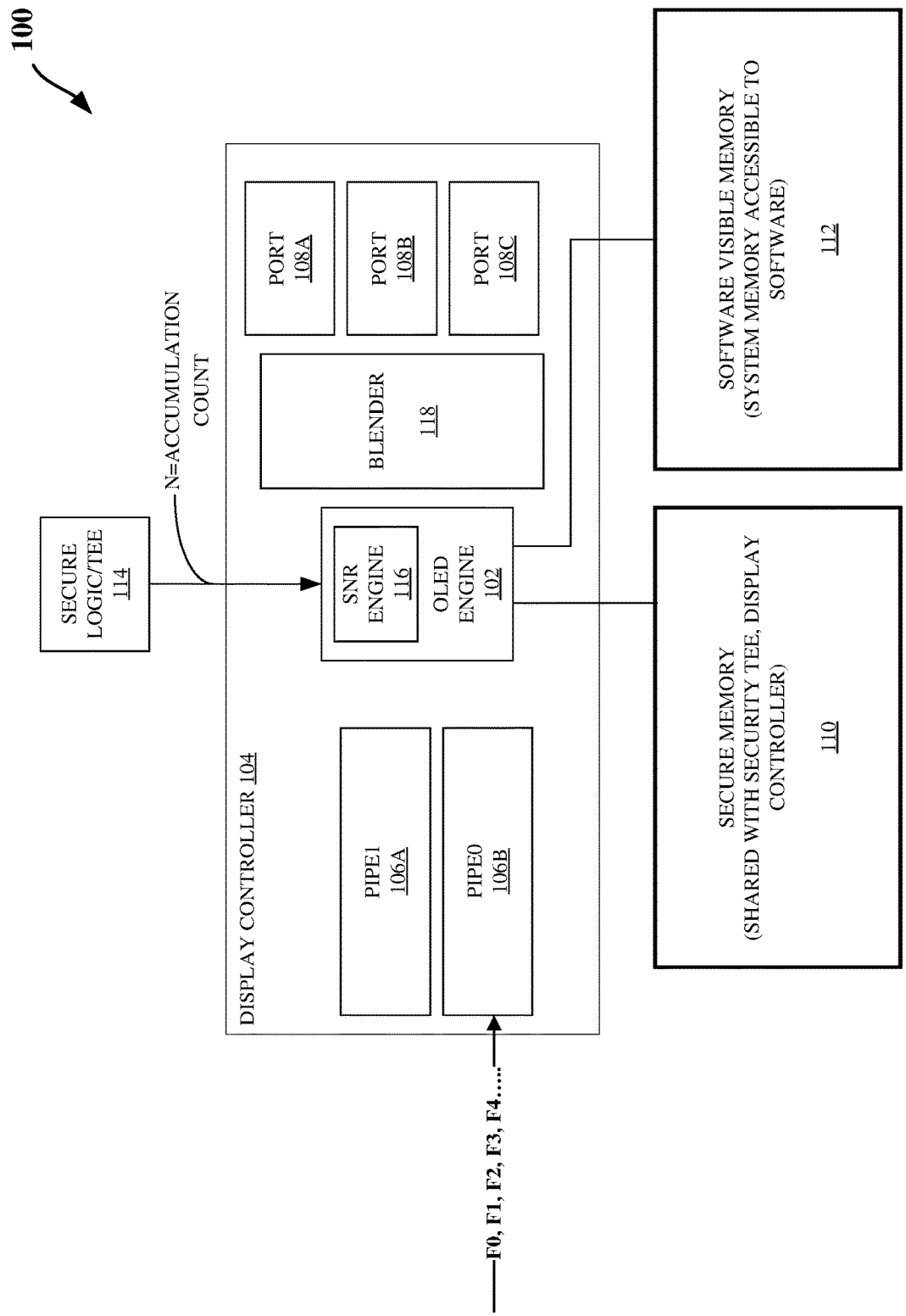
FIG. 1 illustrates a block diagram of a system according to an embodiment.

FIG. 1 illustrates a block diagram of a system 100, according to an embodiment. System 100 includes the following components to allow OLED compensation based on protected content:

(1) OLED Engine/Logic 102 is added to the display controller 104—This engine 102 is responsible for accumulating all the pixels that flow from the pipe(s) 106A/106B to the ports 108A/108B/108C of the display controller 104. To store intermediate data, the OLED engine stores the frames in Secure Memory 110 and increments the frame number n. After n==N accumulations, the accumulated data is written by the OLED engine to the software visible memory 112. N is provided by a secure agent/logic 114 (or Trusted Execution Environment (TEE)) and is a secret. New instructions are also introduced to program N securely to the OLED engine in one or more embodiments. Also, embodiments are not limited to a display controller including the OLED engine and the OLED engine may be implemented elsewhere (e.g., couple to the display controller) as long as it has access to the passing protected frames.

(2) Signal to Noise Ratio (SNR) Engine/Logic 116—The SNR engine is responsible for comparing adjacent frames (e.g., Fn and Fn−1) to ensure that there is a sufficient delta between adjacent frames such that Fn and Fn−1. In at least one embodiment, the SNR engine is part of the OLED engine and it compares the current frame to the previous one to ensure that there is enough delta in the pixels to prevent an attack where software replays the same trusted frame to eventually extract the pixels/frame. If the delta (SNR) is insufficient, the SNR engine stops incrementing n until SNR increases to a threshold level to confirm that the delta has become sufficient again. This is used to prevent frame replay attacks where an attacker could use an accumulator and submit it the same frame N times to extract a frame. For example, in an RGB format, each of the red, green, blue component can be a byte and the SNR engine compares the difference between the byte values. This delta can be set anywhere from 1 to 255 (for the 8-bit channels) and will offer varying degrees of security. In an embodiment, the threshold level can be selected by the design and does not need to be programmed externally.

(3) Memory Areas—There are two pre-allocated memory areas: (a) Secure Memory 110 area—this is only accessible to TEE 114 and/or display controller 104; and (b) Software Visible Memory (SVM) 112 area—SVM is accessible to display controller 104 and/or the system software.

Blender logic 118 merges different data planes received from the pipe(s) 106A/106B to generate a final image for transmission to the ports 108A/108B/108C.

Figure 2A:
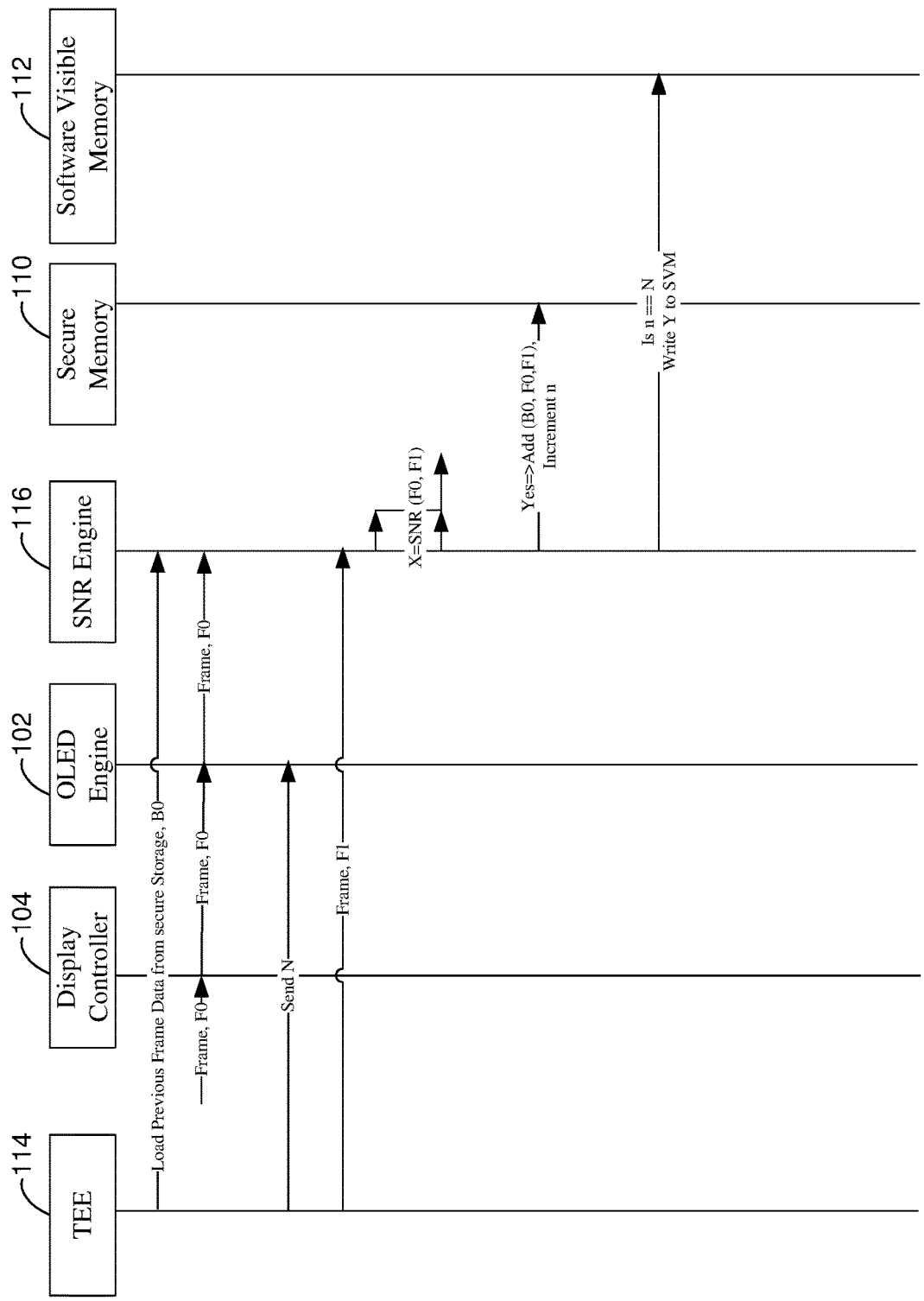
FIGS. 2A and 2B illustrate flow diagrams methods according to some embodiments.

FIG. 2A illustrates a flow diagram of a method 200, according to an embodiment. Referring to FIGS. 1 and 2, the TEE 114 is responsible for sending N to the display controller 104. N refers to the total number of frames that need to be accumulated by the OLED engine 102 before providing the accumulated pixel values to untrusted software 112 to perform OLED compensation. To do so, some embodiments introduce two instructions, WRAP_SECRET and UNWRAP_SECRET. The first instruction WRAP_SECRET allows a TEE to wrap/encode information for secure transmission through an untrusted stack. For example, the TEE populates the structure shown in the table of FIG. 3. More particularly, FIG. 3 illustrates a sample structure for the WRAP_SECRET instruction, accordingly to an embodiment.

For some of the proposed embodiments, software/logic will populate the target as display/OLED engine, populate the target data with two values, N, the total number of frames required before accumulated pixel data can be written out to untrusted memory 112 and SEC_N, the total number of secure frames that need to be accumulated before the accumulate pixel values can be written out to untrusted memory 112. The accumulation of a certain number of secure frames ensures that untrusted software cannot send one single secure frame and all other untrusted frames and cause the OLED engine to dump accumulated pixel content from which it can recover the secure frame knowing all other frame values.

As shown in FIG. 3, the MAC field carries a cryptographic Message Authentication Code (MAC) generated on top of the fields in this structure. The instruction WRAP_SECRET generates the MAC to ensure that untrusted software cannot modify the fields without detection. In an embodiment, the WRAP_SECRET instruction is not performing any programming to the desired target but only prepares and secures the programming information.

An embodiment provides another instruction called UNWRAP_SECRET which takes the wrapped blob (or an encrypted form of the (e.g., binary) structure shown in FIG. 3) generated from WRAP_SECRET as a parameter. The UNWRAP_SECRET instruction verifies the MAC on the blob/data and programs the appropriate registers to the platform resource as guided by the target data or identifier (ID) field. The wrapping and unwrapping/decoding may be done using a key (e.g., only known to microcode (or ucode) and/or firmware) which may be generated by hardware at reset and used for the entire reset cycle. The status of instruction execution may be returned in a register (such as EAX).

Once the two secret values N and SEC_N are programmed to the OLED engine, the TEE can start submitting secure frames to the display engine for display using untrusted software. The SNR engine before displaying each frame will read the previous frame from secure storage (the SNR engine can also implement local caching of the previous frame as an implementation choice). The SNR engine then compares the frame to be displayed with the previous frame to ensure that they are sufficiently different, and an attacker is not attempting to submit the same frame to extract the secure frame value. Note that the threshold value can also be submitted using the WRAP_SECRET instruction by trusted software or TEE in an embodiment.

Referring to FIG. 2A, once the SNR engine confirms that enough delta with the previous frame, the SNR engine increments n (an internal count maintained and compared with N). The SNR engine increments SEC_N (number of secure frames) when it displays a secure frame (not shown in the figures above). The SNR engine generates an accumulated pixel value frame by adding the pixel values of the current frame to the previous frame fetched from secure storage (or internal storage). Once the total number of frames displayed is equal to N and at least SEC_N secure frames have been displayed, a random value to a maximum of MAX_RGB is added to the accumulated value, and the accumulated pixels frame is written out to software visible memory 112, from where untrusted software can read it and perform OLED compensation. Since the protected frames are never visible to untrusted software separately, there is no possibility for it to recover them and break content protection guarantees. While some embodiments use accumulation as a simple function for obfuscating pixel values of frames from untrusted software, embodiments are not limited to this and any other irreversible function can be used as well.

Since the untrusted software does not know N or SEC_N, there is no ability for the untrusted software to extract the individual items in the per-pixel accumulated value. The accumulated value informs the untrusted software per-pixel deterioration without disclosing the actual frame to the untrusted software.

Hence, some embodiments provide one or more techniques for obtaining accumulated pixel data for protected content without disclosing individual protected pixels. Furthermore, in various embodiments, to counter potential attackers that may perform analysis on various data granularities, one or more of the following techniques may be used:

(1) The accumulated frame value may be quantized by the GPU (Graphics Processing Unit) or another execution logic using a vector quantizer. Since quantization is generally lossy, it is not possible to recover the accumulated pixel values and/or recover the pixel value per frame.

(2) May use a True/Hardware Random Number Generator/Cryptographically Secure Pseudorandom Number Generator (TRNG/CSPRNG) to add a random number in the accumulated frame values. This approach is efficient since GPUs generally support High-bandwidth Digital Content Protection (HDCP) or other Digital Rights Management (DRM) or include a TRNG. Once the accumulated pixel values include randomness, it is not possible to extract the individual pixels or even the accumulated values without breaking the TRNG.

Figure 2B:
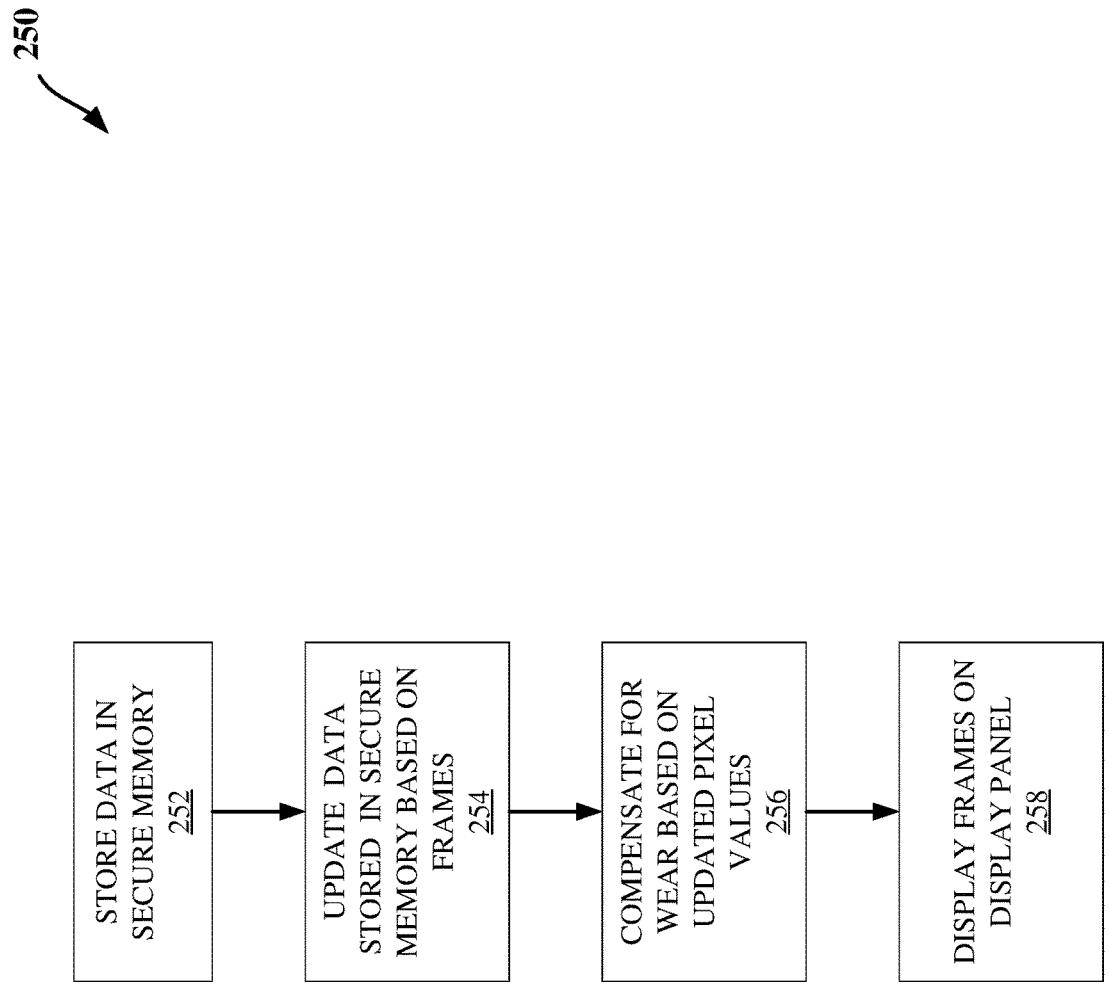

FIG. 2B illustrates a flow diagram of a method 250 to provide OLED compensation based on protected content, according to an embodiment. One or more operations discussed with reference to method 250 may be performed by the components of FIG. 1.

Referring to FIGS. 1, 2A, and 2B, at an operation 252, data that is only accessible by trusted logic 102 is stored in secure memory 110. At an operation 254, display controller logic circuitry 104 updates pixel values to be stored in the secure memory based on a plurality of frames. In an embodiment, the display controller logic circuitry allows access by untrusted software (e.g., via memory 112) to the updated pixel values after a first number of updates to the pixel values stored in the secure memory. In at least one embodiment, the security logic provides the first number to the display logic circuitry. In one embodiment, the secure memory is inaccessible by the untrusted software.

At an operation 256, the untrusted software compensates for wear on a display panel based at least in part on the updated pixel values. At an operation 258, a display panel (e.g., coupled to the display controller logic (not shown)) displays the plurality of frames. In at least an embodiment, the display panel is an Organic Light Emitting Diode (OLED) display panel. At an operation 260, the display controller logic circuitry 104 allows access by the untrusted software to the updated pixel values by causing the updated pixel values to be written to a software visible memory 112. At an operation 262, the display controller logic circuitry updates the pixel values by accumulating the pixel values.

Additionally, some embodiments may be applied in computing systems that include one or more processors (e.g., where the one or more processors may include one or more processor cores), such as those discussed with reference to FIG. 1 et seq., including for example a desktop computer, a work station, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

FIG. 4A is a block diagram illustrating an exemplary instruction format according to embodiments. FIG. 4A shows an instruction format 400 that is specific in the sense that it specifies the location, size, interpretation, and order of the fields, as well as values for some of those fields. The instruction format 400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions.

EVEX Prefix (Bytes 0-3) 402—is encoded in a four-byte form.

Format Field 482 (EVEX Byte 0, bits [7:0])—the first byte (EVEX Byte 0) is the format field 482 and it contains 0x62 (the unique value used for distinguishing the vector friendly instruction format in one embodiment).

The second-fourth bytes (EVEX Bytes 1-3) include a number of bit fields providing specific capability.

REX field 405 (EVEX Byte 1, bits [7-5])—consists of a EVEX.R bit field (EVEX Byte 1, bit [7]-R), EVEX.X bit field (EVEX byte 1, bit [6]-X), and 457BEX byte 1, bit[5]-B). The EVEX.R, EVEX.X, and EVEX.B bit fields provide the same functionality as the corresponding VEX bit fields, and are encoded using is complement form, i.e., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field QAc10—this is the EVEX.R' bit field (EVEX Byte 1, bit [4]-R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 415 (EVEX byte 1, bits [3:0]-mmmm)—its content encodes an implied leading opcode byte (0F, 0F 38, or 0F 3).

Data element width field 464 (EVEX byte 2, bit [7]-W)—is represented by the notation EVEX.W. EVEX.W is used to define the granularity (size) of the datatype (either 32-bit data elements or 64-bit data elements). This field is optional in the sense that it is not needed if only one data element width is supported and/or data element widths are supported using some aspect of the opcodes.

EVEX.vvvv 420 (EVEX Byte 2, bits [6:3]-vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 420 encodes the 4 low-order bits of the first source register specifier stored in inverted (1 s complement) form. Depending on the instruction, an extra different EVEX bit field is used to extend the specifier size to 32 registers.

EVEX.U 468 Class field (EVEX byte 2, bit [2]-U)—If EVEX.U=0, it indicates class A (support merging-write-masking) or EVEX.U0; if EVEX.U=1, it indicates class B (support zeroing and merging-writemasking) or EVEX.U1.

Prefix encoding field 425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 453 (EVEX byte 3, bit [7]-EH; also known as EVEX.EH, EVEX.rs, EVEX.RL, EVEX.writemask control, and EVEX.N; also illustrated with α)—its content distinguishes which one of the different augmentation operation types are to be performed.

Beta field 455 (EVEX byte 3, bits [6:4]-SSS, also known as EVEX.s2-0, EVEX.r2-0, EVEX.rr1, EVEX.LL0, EVEX.LLB; also illustrated with βββ)—distinguishes which of the operations of a specified type are to be performed.

REX' field 410—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Writemask field 471 (EVEX byte 3, bits [2:0]-kkk)—its content specifies the index of a register in the writemask registers. In one embodiment, the specific value EVEX kkk=000 has a special behavior implying no writemask is used for the particular instruction (this may be implemented in a variety of ways including the use of a writemask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the writemask field 471 allows for partial vector operations, including loads, stores, arithmetic, logical, etc. While embodiments are described in which the writemask field's 471 content selects one of a number of writemask registers that contains the writemask to be used (and thus the writemask field's 471 content indirectly identifies that masking to be performed), alternative embodiments instead or additional allow the mask write field's 471 content to directly specify the masking to be performed.

Real Opcode Field 430 (Byte 4) is also known as the opcode byte. Part of the opcode is specified in this field.

MOD R/M Field 440 (Byte 5) includes MOD field 442, register index field 444, and R/M field 446. The MOD field's 442 content distinguishes between memory access and non-memory access operations. The role of register index field 444 can be summarized to two situations: encoding either the destination register operand or a source register operand, or be treated as an opcode extension and not used to encode any instruction operand. The content of register index field 444, directly or through address generation, specifies the locations of the source and destination operands, be they in registers or in memory. These include a sufficient number of bits to select N registers from a P×Q (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

The role of R/M field 446 may include the following: encoding the instruction operand that references a memory address, or encoding either the destination register operand or a source register operand.

Scale, Index, Base (SIB) Byte (Byte 6)—The scale field's 450 content allows for the scaling of the index field's content for memory address generation (e.g., for address generation that uses 2 scale*index+base). SIB.xxx 454 and SIB.bbb 456—the contents of these fields have been previously referred to with regard to the register indexes Xxxx and Bbbb.

Displacement field 463A (Bytes 7-10)—when MOD field 442 contains 10, bytes 7-10 are the displacement field 463A, and it works the same as the legacy 32-bit displacement (disp32) and works at byte granularity. This may be used as part of memory address generation (e.g., for address generation that uses 2 scale*index+base+displacement).

Displacement factor field 463B (Byte 7)—when MOD field 442 contains 01, byte 7 is the displacement factor field 463B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 463B is a reinterpretation of disp8; when using displacement factor field 463B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 463B substitutes the legacy x86 instruction set 8-bit displacement. Thus, the displacement factor field 463B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 472 allows for the specification of an immediate. This field is optional in the sense that is it not present in an implementation of the generic vector friendly format that does not support immediate and it is not present in instructions that do not use an immediate.

Full Opcode Field

FIG. 4B is a block diagram illustrating the fields of the instruction format 400 that make up the full opcode field 474 according to one embodiment. Specifically, the full opcode field 474 includes the format field 482, the base operation field 443, and the data element width (W) field 463. The base operation field 443 includes the prefix encoding field 425, the opcode map field 415, and the real opcode field 430.

Register Index Field

FIG. 4C is a block diagram illustrating the fields of the format 400 that make up the register index field 445 according to one embodiment. Specifically, the register index field 445 includes the REX field 405, the REX' field 410, the MODR/M.reg field 444, the MODR/M.r/m field 446, the VVVV field 420, xxx field 454, and the bbb field 456.

Augmentation Operation Field

Figure 4D:
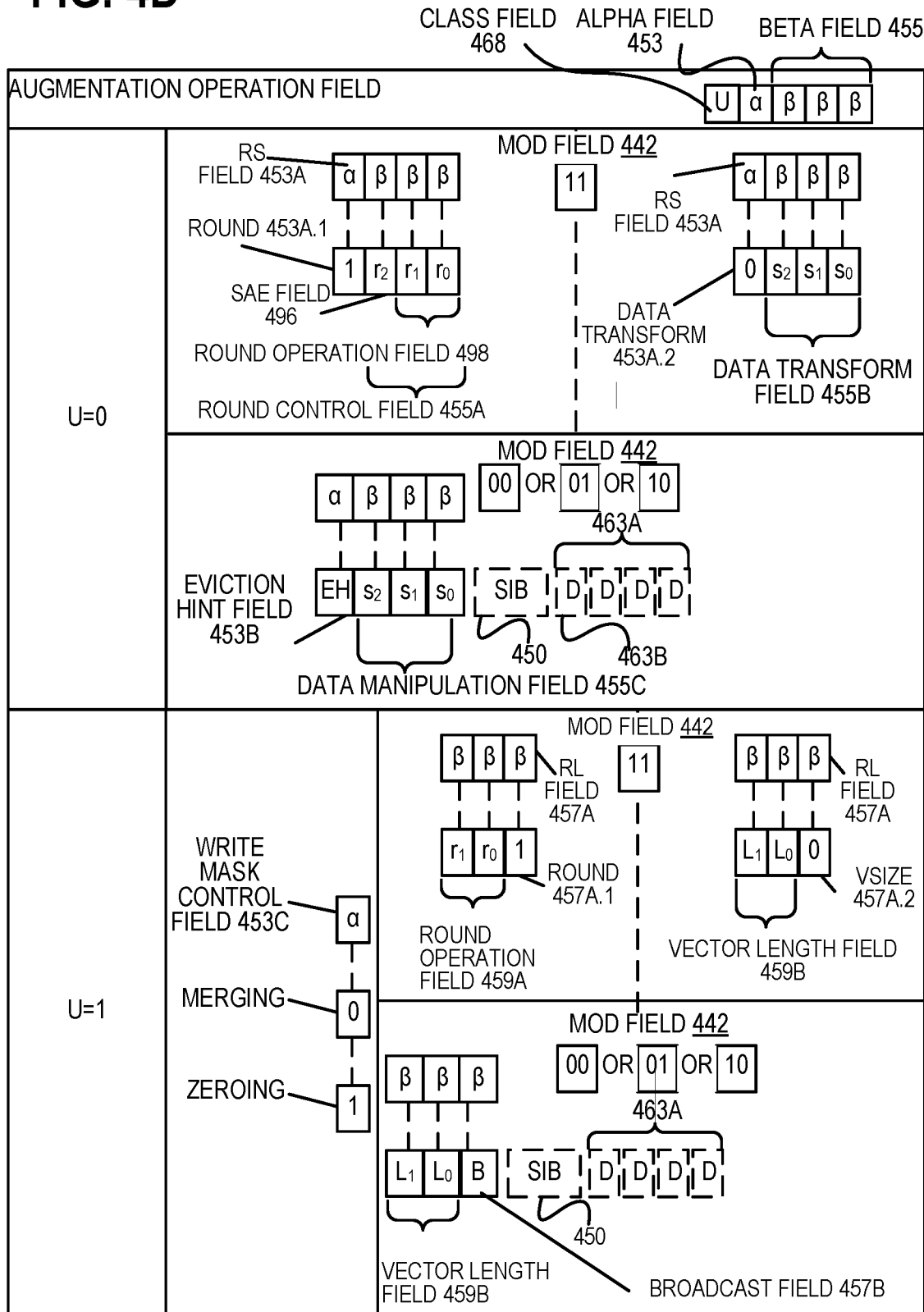
FIG. 4D is a block diagram illustrating the fields of the instruction format that make up the augmentation operation field according to one embodiment.

FIG. 4D is a block diagram illustrating the fields of the instruction format 400 that make up an augmentation operation field according to one embodiment. When the class (U) field 468 contains 0, it signifies EVEX.U0 (class A 468A); when it contains 1, it signifies EVEX.U1 (class B 468B). When U=0 and the MOD field 442 contains 11 (signifying a no memory access operation), the alpha field 453 (EVEX byte 3, bit [7]-EH) is interpreted as the rs field 453A. When the rs field 453A contains a 1 (round 453A.1), the beta field 455 (EVEX byte 3, bits [6:4]-SSS) is interpreted as the round control field 455A. The round control field 455A includes a one bit SAE field 496 and a two bit round operation field 498. When the rs field 453A contains a 0 (data transform 453A.2), the beta field 455 (EVEX byte 3, bits [6:4]-SSS) is interpreted as a three bit data transform field 455B. When U=0 and the MOD field 442 contains 00, 01, or 10 (signifying a memory access operation), the alpha field 453 (EVEX byte 3, bit [7]-EH) is interpreted as the eviction hint (EH) field 453B and the beta field 455 (EVEX byte 3, bits [6:4]-SSS) is interpreted as a three bit data manipulation field 455C.

When U=1, the alpha field 453 (EVEX byte 3, bit [7]-EH) is interpreted as the writemask control (Z) field 453C. When U=1 and the MOD field 442 contains 11 (signifying a no memory access operation), part of the beta field 455 (EVEX byte 3, bit [4]-S0) is interpreted as the RL field 457A; when it contains a 1 (round 457A.1) the rest of the beta field 455 (EVEX byte 3, bit [6-5]-S2-1) is interpreted as the round operation field 459A, while when the RL field 457A contains a 0 (VSIZE 457.A2) the rest of the beta field 455 (EVEX byte 3, bit [6-5]-S2-1) is interpreted as the vector length field 459B (EVEX byte 3, bit [6-5]-L1-0). When U=1 and the MOD field 442 contains 00, 01, or 10 (signifying a memory access operation), the beta field 455 (EVEX byte 3, bits [6:4]-SSS) is interpreted as the vector length field 459B (EVEX byte 3, bit [6-5]-L1-0) and the broadcast field 457B (EVEX byte 3, bit [4]-B).

Exemplary Register Architecture

Figure 5:
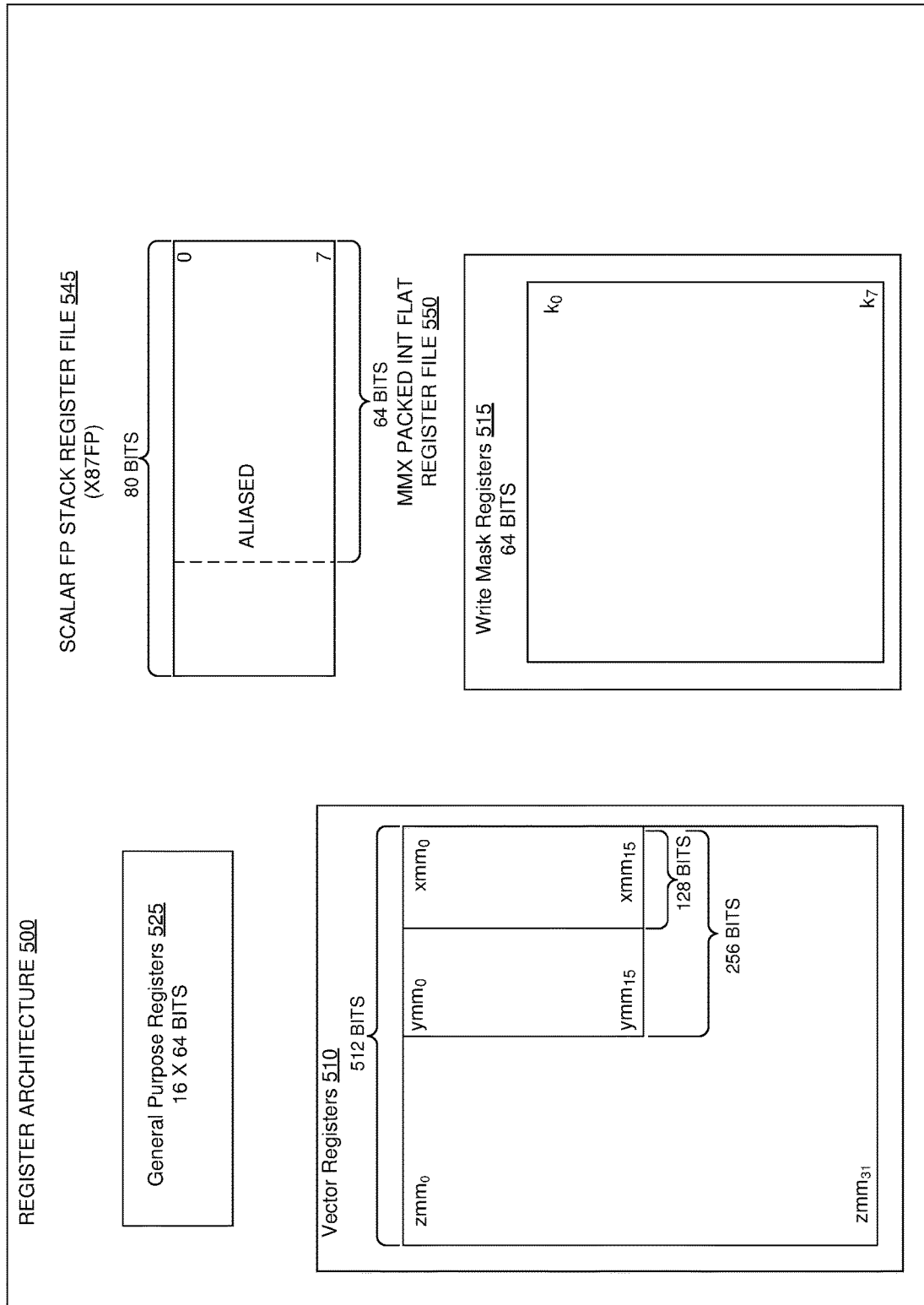
FIG. 5 is a block diagram of a register architecture according to one embodiment.

FIG. 5 is a block diagram of a register architecture 500 according to one embodiment. In the embodiment illustrated, there are 32 vector registers 510 that are 512 bits wide; these registers are referenced as ZMM0 through ZMM31. The lower order 256 bits of the lower 16 ZMM registers are overlaid on registers YMM0-16. The lower order 128 bits of the lower 16 ZMM registers (the lower order 128 bits of the YMM registers) are overlaid on registers XMM0-15. In other words, the vector length field 459B selects between a maximum length and one or more other shorter lengths, where each such shorter length is half the length of the preceding length; and instructions templates without the vector length field 459B operate on the maximum vector length. Further, in one embodiment, the class B instruction templates of the instruction format 400 operate on packed or scalar single/double-precision floating point data and packed or scalar integer data. Scalar operations are operations performed on the lowest order data element position in a ZMM/YMM/XMM register; the higher order data element positions are either left the same as they were prior to the instruction or zeroed depending on the embodiment.

Writemask registers 515—in the embodiment illustrated, there are 8 writemask registers (k0 through k7), each 64 bits in size. In an alternate embodiment, the writemask registers 515 are 16 bits in size. In some embodiments, the vector mask register k0 cannot be used as a writemask; when the encoding that would normally indicate k0 is used for a writemask, it selects a hardwired writemask of 0xFFFF, effectively disabling writemasking for that instruction.

General-purpose registers 525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 545, on which is aliased the MMX packed integer flat register file 550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

Figure 6:
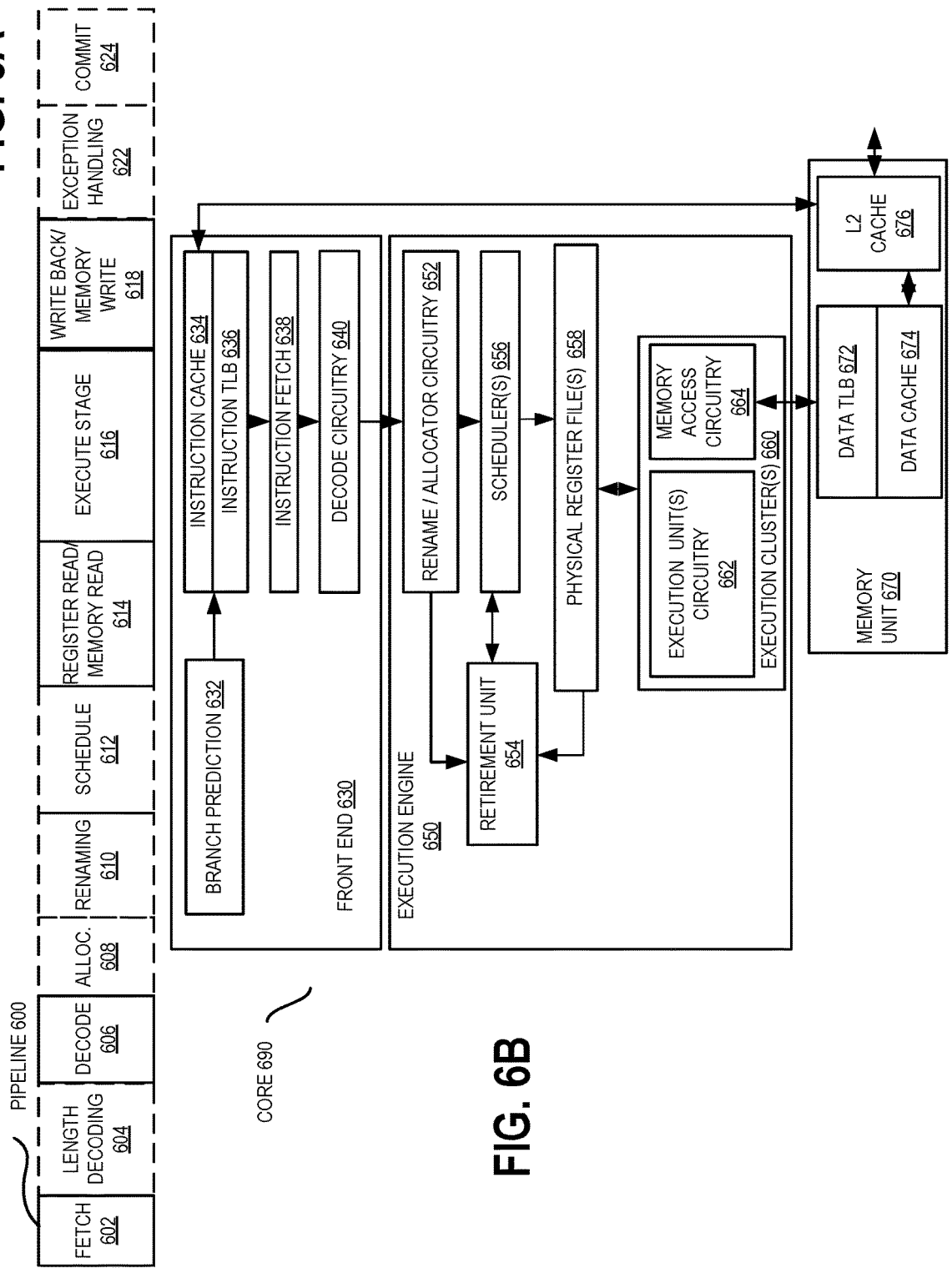
FIG. 6A is a block diagram illustrating both an exemplary in-order pipeline and an exemplary register renaming, out-of-order issue/execution pipeline according to embodiments.
FIG. 6B is a block diagram illustrating both an exemplary embodiment of an in-order architecture core and an exemplary register renaming, out-of-order issue/execution architecture core to be included in a processor according to embodiments.

FIG. 6A is a block diagram illustrating both an exemplary in-order pipeline and an exemplary register renaming, out-of-order issue/execution pipeline according to embodiments. FIG. 6B is a block diagram illustrating both an exemplary embodiment of an in-order architecture core and an exemplary register renaming, out-of-order issue/execution architecture core to be included in a processor according to embodiments. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a writemask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

Figure 7:
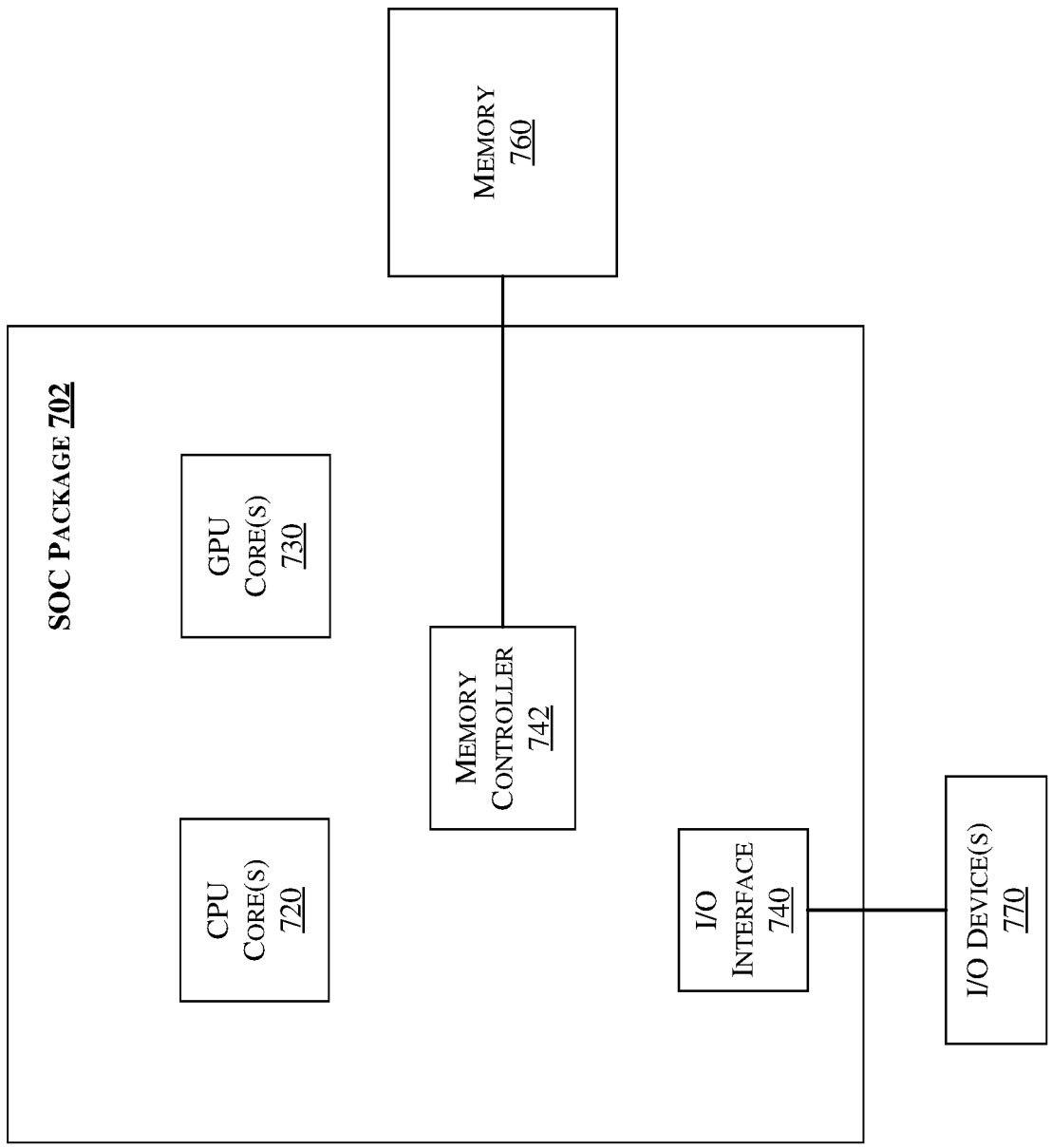
FIG. 7 illustrates a block diagram of an SOC (System on Chip) package in accordance with an embodiment.

FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 702 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

Figure 8:
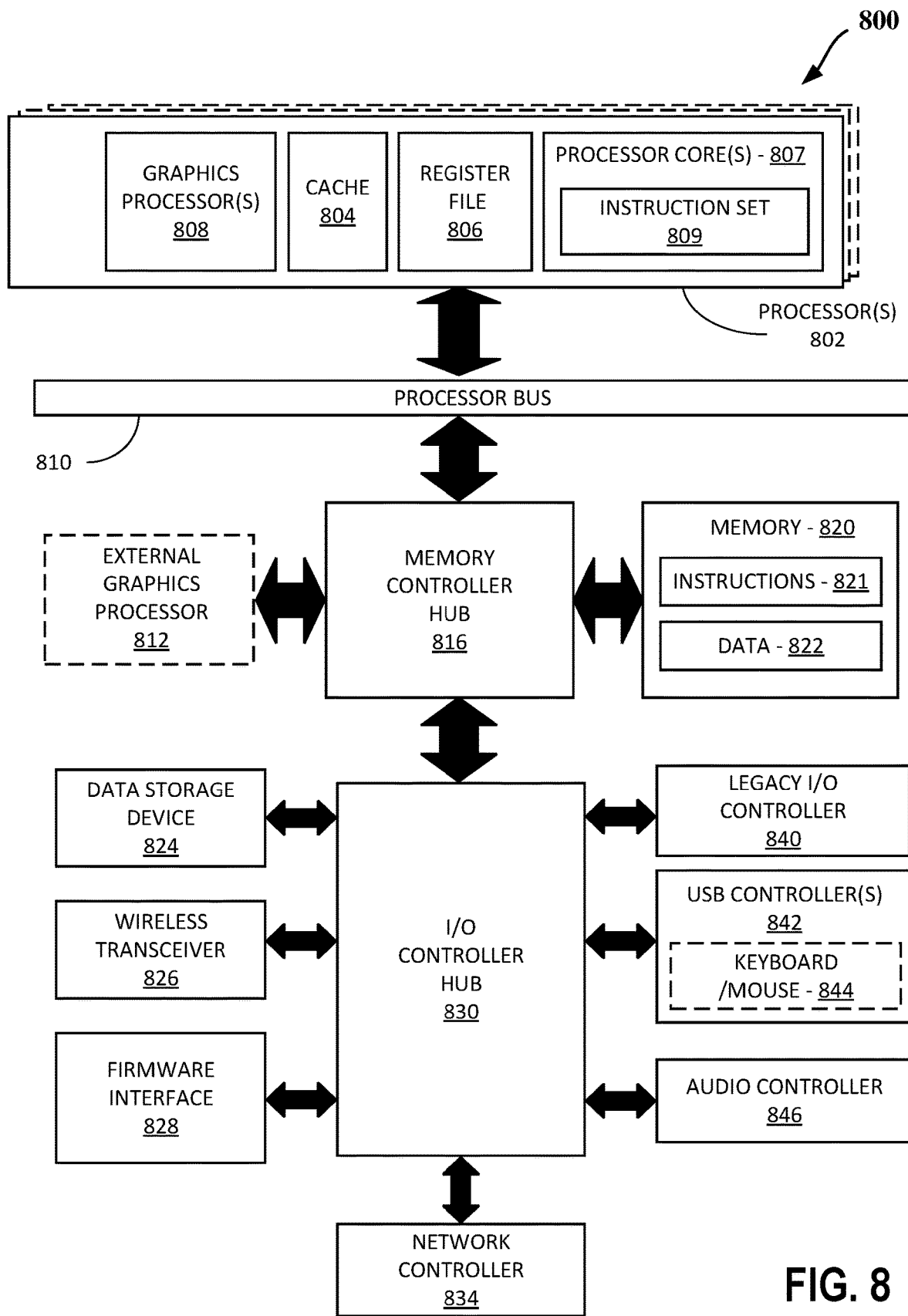
FIG. 8 is a block diagram of a processing system, according to an embodiment.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as0 a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random access memory (DRAM) device, a static random access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9:
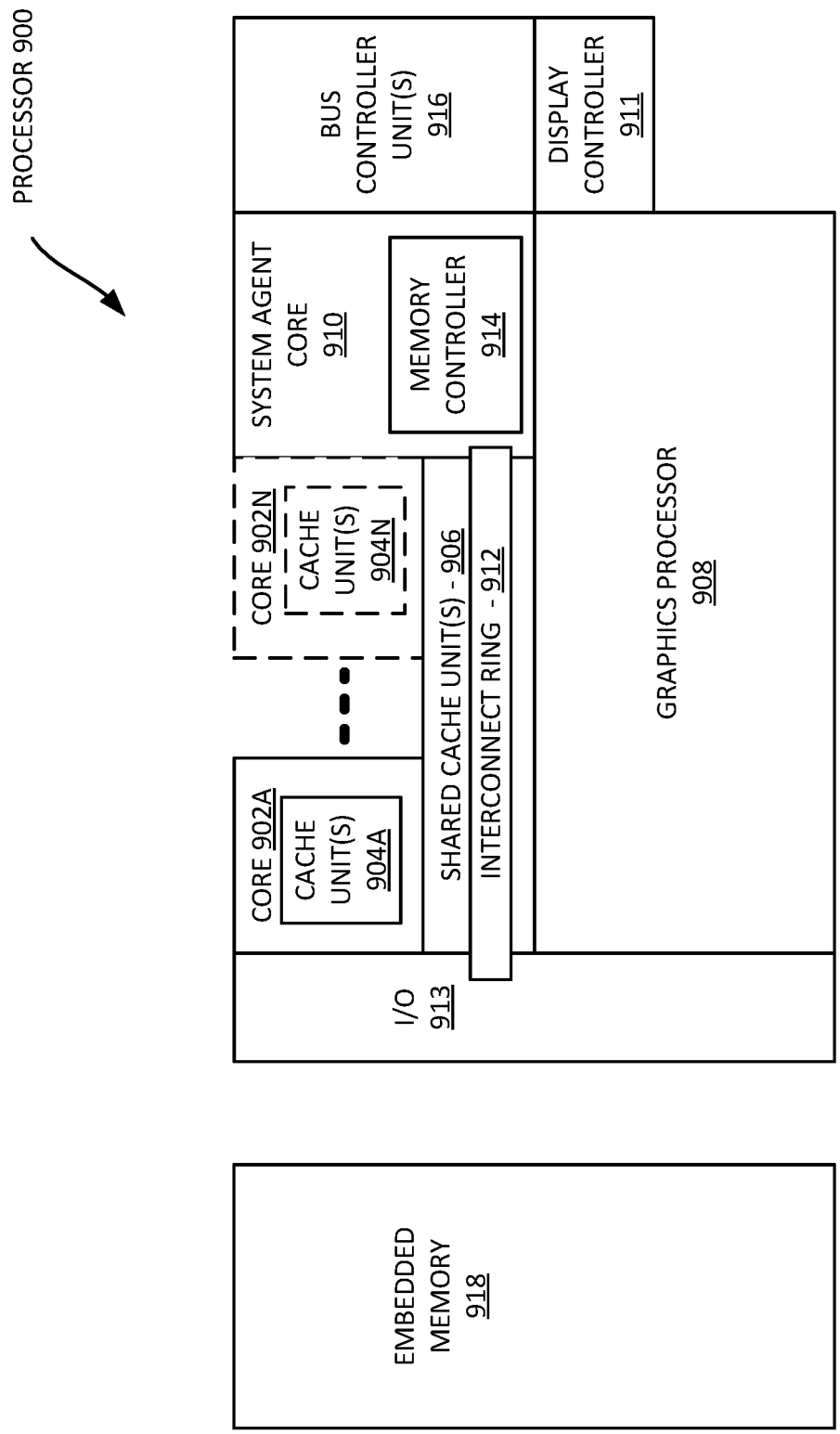
FIG. 9 is a block diagram of an embodiment of a processor having one or more processor cores, according to some embodiments.

FIG. 9 is a block diagram of an embodiment of a processor 900 having one or more processor cores 902A to 902N, an integrated memory controller 914, and an integrated graphics processor 908. Those elements of FIG. 9 having the same reference numbers (or names) as the elements of any other figure herein can operate or function in any manner similar to that described elsewhere herein, but are not limited to such. Processor 900 can include additional cores up to and including additional core 902N represented by the dashed lined boxes. Each of processor cores 902A to 902N includes one or more internal cache units 904A to 904N. In some embodiments each processor core also has access to one or more shared cached units 906.

The internal cache units 904A to 904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A to 904N.

In some embodiments, processor 900 may also include a set of one or more bus controller units 916 and a system agent core 910. The one or more bus controller units 916 manage a set of peripheral buses, such as one or more Peripheral Component Interconnect buses (e.g., PCI, PCI Express). System agent core 910 provides management functionality for the various processor components. In some embodiments, system agent core 910 includes one or more integrated memory controllers 914 to manage access to various external memory devices (not shown).

In some embodiments, one or more of the processor cores 902A to 902N include support for simultaneous multi-threading. In such embodiment, the system agent core 910 includes components for coordinating and operating cores 902A to 902N during multi-threaded processing. System agent core 910 may additionally include a power control unit (PCU), which includes logic and components to regulate the power state of processor cores 902A to 902N and graphics processor 908.

In some embodiments, processor 900 additionally includes graphics processor 908 to execute graphics processing operations. In some embodiments, the graphics processor 908 couples with the set of shared cache units 906, and the system agent core 910, including the one or more integrated memory controllers 914. In some embodiments, a display controller 911 is coupled with the graphics processor 908 to drive graphics processor output to one or more coupled displays. In some embodiments, display controller 911 may be a separate module coupled with the graphics processor via at least one interconnect, or may be integrated within the graphics processor 908 or system agent core 910.

In some embodiments, a ring based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM (or embedded DRAM) module. In some embodiments, each of the processor cores 902 to 902N and graphics processor 908 use embedded memory modules 918 as a shared Last Level Cache.

In some embodiments, processor cores 902A to 902N are homogenous cores executing the same instruction set architecture. In another embodiment, processor cores 902A to 902N are heterogeneous in terms of instruction set architecture (ISA), where one or more of processor cores 902A to 902N execute a first instruction set, while at least one of the other cores executes a subset of the first instruction set or a different instruction set. In one embodiment processor cores 902A to 902N are heterogeneous in terms of microarchitecture, where one or more cores having a relatively higher power consumption couple with one or more power cores having a lower power consumption. Additionally, processor 900 can be implemented on one or more chips or as an SoC integrated circuit having the illustrated components, in addition to other components.

Figure 10:
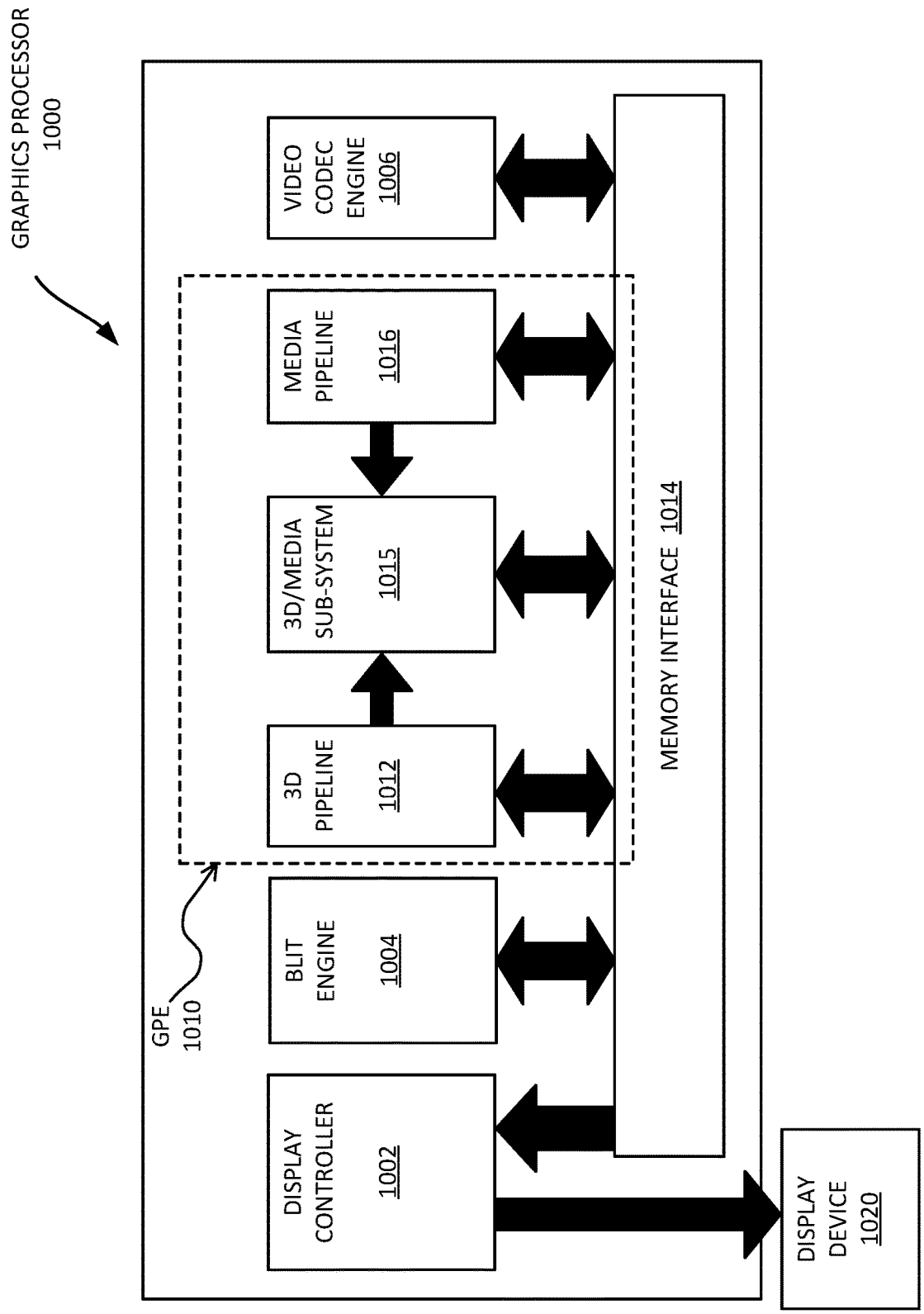
FIG. 10 is a block diagram of a graphics processor, according to an embodiment.

FIG. 10 is a block diagram of a graphics processor 1000, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1000 includes a memory interface 1014 to access memory. Memory interface 1014 can be an interface to local memory, one or more internal caches, one or more shared external caches, and/or to system memory.

In some embodiments, graphics processor 1000 also includes a display controller 1002 to drive display output data to a display device 1020. Display controller 1002 includes hardware for one or more overlay planes for the display and composition of multiple layers of video or user interface elements. In some embodiments, graphics processor 1000 includes a video codec engine 1006 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 1000 includes a block image transfer (BLIT) engine 1004 to perform two-dimensional (2D) rasterizer operations including, for example, bit-boundary block transfers. However, in one embodiment, 3D graphics operations are performed using one or more components of graphics processing engine (GPE) 1010. In some embodiments, graphics processing engine 1010 is a compute engine for performing graphics operations, including three-dimensional (3D) graphics operations and media operations.

In some embodiments, GPE 1010 includes a 3D pipeline 1012 for performing 3D operations, such as rendering three-dimensional images and scenes using processing functions that act upon 3D primitive shapes (e.g., rectangle, triangle, etc.). The 3D pipeline 1012 includes programmable and fixed function elements that perform various tasks within the element and/or spawn execution threads to a 3D/Media sub-system 1015. While 3D pipeline 1012 can be used to perform media operations, an embodiment of GPE 1010 also includes a media pipeline 1016 that is specifically used to perform media operations, such as video post-processing and image enhancement.

In some embodiments, media pipeline 1016 includes fixed function or programmable logic units to perform one or more specialized media operations, such as video decode acceleration, video de-interlacing, and video encode acceleration in place of, or on behalf of video codec engine 1006. In some embodiments, media pipeline 1016 additionally includes a thread spawning unit to spawn threads for execution on 3D/Media sub-system 1015. The spawned threads perform computations for the media operations on one or more graphics execution units included in 3D/Media sub-system 1015.

In some embodiments, 3D/Media subsystem 1015 includes logic for executing threads spawned by 3D pipeline 1012 and media pipeline 1016. In one embodiment, the pipelines send thread execution requests to 3D/Media sub-system 1015, which includes thread dispatch logic for arbitrating and dispatching the various requests to available thread execution resources. The execution resources include an array of graphics execution units to process the 3D and media threads. In some embodiments, 3D/Media subsystem 1015 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: secure memory to store data that is only accessible by trusted logic; and display controller logic circuitry to update pixel values to be stored in the secure memory based on a plurality of frames, wherein the display controller logic circuitry is to allow access by untrusted software to the updated pixel values after a first number of updates to the pixel values stored in the secure memory. Example 2 includes the apparatus of example 1, wherein the untrusted software is to compensate for wear on a display panel based at least in part on the updated pixel values. Example 3 includes the apparatus of example 1, wherein a display panel, coupled to the display controller logic, is to display the plurality of frames, wherein the display panel is an Organic Light Emitting Diode (OLED) display panel. Example 4 includes the apparatus of example 1, wherein the display controller logic circuitry is to allow access by the untrusted software to the updated pixel values by causing the updated pixel values to be written to a software visible memory. Example 5 includes the apparatus of example 1, wherein the display controller logic circuitry is to update the pixel values by accumulating the pixel values. Example 6 includes the apparatus of example 1, wherein the secure memory is to be inaccessible by the untrusted software. Example 7 includes the apparatus of example 1, comprising security logic to provide the first number to the display logic circuitry. Example 8 includes the apparatus of example 1, wherein the first number is one of: (1) a total number of frames to cause an update to the pixel values before the display controller logic circuitry is to allow access by the untrusted software to the updated pixel values; and (2) a total number of protected frames to cause an update to the pixel values before the display controller logic circuitry is to allow access by the untrusted software to the updated pixel values. Example 9 includes the apparatus of example 1, comprising logic circuitry to compare two or more adjacent frames from the plurality of frames to determine whether a sufficient difference exist between the two or more adjacent frames. Example 10 includes the apparatus of example 1, comprising logic circuitry to compare two or more adjacent frames from the plurality of frames to determine whether a sufficient difference exist between the two or more adjacent frames, wherein incrementing a counter value is to be stopped in response to a determination that the sufficient difference is absent between the two or more adjacent frames, wherein the counter is to be compared with the first number to determine whether to allow access by the untrusted software to the updated pixel values. Example 11 includes the apparatus of example 1, comprising logic circuitry to compare two or more adjacent frames from the plurality of frames to determine whether a sufficient difference exist between the two or more adjacent frames, wherein incrementing a counter value is to be resumed in response to a determination that the sufficient difference is present between the two or more adjacent frames, wherein the counter is to be compared with the first number to determine whether to allow access by the untrusted software to the updated pixel values. Example 12 includes the apparatus of example 1, comprising execution logic capable to execute a first instruction to allow encoding of information to program the display controller logic circuitry. Example 13 includes the apparatus of example 12, wherein the execution logic is capable to execute a second instruction is to allow decoding of the encoded information.

Example 14 includes one or more non-transitory computer-readable media comprising one or more instructions that when executed on a processor configure the processor to perform one or more operations to cause: secure memory to store data that is only accessible by trusted logic; and display controller logic circuitry to update pixel values to be stored in the secure memory based on a plurality of frames, wherein the display controller logic circuitry is to allow access by untrusted software to the updated pixel values after a first number of updates to the pixel values stored in the secure memory. Example 15 includes the one or more computer-readable media of example 14, further comprising one or more instructions that when executed on the at least one processor configure the at least one processor to perform one or more operations to cause the untrusted software to compensate for wear on a display panel based at least in part on the updated pixel values. Example 16 includes the one or more computer-readable media of example 14, further comprising one or more instructions that when executed on the at least one processor configure the at least one processor to perform one or more operations to cause a display panel, coupled to the display controller logic, to display the plurality of frames, wherein the display panel is an Organic Light Emitting Diode (OLED) display panel. Example 17 includes the one or more computer-readable media of example 14, further comprising one or more instructions that when executed on the at least one processor configure the at least one processor to perform one or more operations to cause the display controller logic circuitry to allow access by the untrusted software to the updated pixel values by causing the updated pixel values to be written to a software visible memory. Example 18 includes the one or more computer-readable media of example 14, further comprising one or more instructions that when executed on the at least one processor configure the at least one processor to perform one or more operations to cause the display controller logic circuitry to updated the pixel values by accumulating the pixel values. Example 19 includes the one or more computer-readable media of example 14, further comprising one or more instructions that when executed on the at least one processor configure the at least one processor to perform one or more operations to cause the secure memory to be inaccessible by the untrusted software. Example 20 includes the one or more computer-readable media of example 14, further comprising one or more instructions that when executed on the at least one processor configure the at least one processor to perform one or more operations to cause security logic to provide the first number to the display logic circuitry.

Example 21 includes a method comprising: storing data that is only accessible by trusted logic in secure memory; and updating, at display controller logic circuitry, pixel values to be stored in the secure memory based on a plurality of frames, wherein the display controller logic circuitry allows access by untrusted software to the updated pixel values after a first number of updates to the pixel values stored in the secure memory. Example 22 includes the method of example 21, further comprising the untrusted software compensating for wear on a display panel based at least in part on the updated pixel values. Example 23 includes the method of example 21, further comprising a display panel, coupled to the display controller logic, displaying the plurality of frames, wherein the display panel is an Organic Light Emitting Diode (OLED) display panel. Example 24 includes the method of example 21, further comprising the display controller logic circuitry allowing access by the untrusted software to the updated pixel values by causing the updated pixel values to be written to a software visible memory. Example 25 includes the method of example 21, further comprising the display controller logic circuitry updating the pixel values by accumulating the pixel values.

Example 26 includes an apparatus comprising means to perform a method as set forth in any preceding example. Example 27 includes machine-readable storage including machine-readable instructions, when executed, to implement a method or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
secure memory to store data that is only accessible by trusted logic; and
display controller logic circuitry to update pixel values to be stored in the secure memory based on a plurality of frames, wherein the display controller logic circuitry is to allow access by untrusted software to the updated pixel values after a first number of updates to the pixel values stored in the secure memory, wherein two or more adjacent frames from the plurality of frames are to be compared to determine whether a sufficient difference exists between the two or more adjacent frames, wherein incrementing a counter value is to be: stopped in response to a determination that the sufficient difference is absent between the two or more adjacent frames, or resumed in response to a determination that the sufficient difference is present between the two or more adjacent frames, wherein the counter is to be compared with the first number to determine whether to allow access by the untrusted software to the updated pixel values.

2. The apparatus of claim 1, wherein the untrusted software is to compensate for wear on a display panel based at least in part on the updated pixel values.

3. The apparatus of claim 1, wherein a display panel, coupled to the display controller logic, is to display the plurality of frames, wherein the display panel is an Organic Light Emitting Diode (OLED) display panel.

4. The apparatus of claim 1, wherein the display controller logic circuitry is to allow access by the untrusted software to the updated pixel values by causing the updated pixel values to be written to a software visible memory.

5. The apparatus of claim 1, wherein the display controller logic circuitry is to update the pixel values by accumulating the pixel values.

6. The apparatus of claim 1, wherein the secure memory is to be inaccessible by the untrusted software.

7. The apparatus of claim 1, comprising security logic to provide the first number to the display logic circuitry.

8. The apparatus of claim 1, wherein the first number is one of: (1) a total number of frames to cause an update to the pixel values before the display controller logic circuity is to allow access by the untrusted software to the updated pixel values; and (2) a total number of protected frames to cause an update to the pixel values before the display controller logic circuity is to allow access by the untrusted software to the updated pixel values.

9. The apparatus of claim 1, comprising execution logic capable to execute a first instruction to allow encoding of information to program the display controller logic circuitry.

10. The apparatus of claim 9, wherein the execution logic is capable to execute a second instruction is to allow decoding of the encoded information.

11. One or more non-transitory computer-readable media comprising one or more instructions that when executed on a processor configure the processor to perform one or more operations to cause:
secure memory to store data that is only accessible by trusted logic; and
display controller logic circuitry to update pixel values to be stored in the secure memory based on a plurality of frames, wherein the display controller logic circuitry is to allow access by untrusted software to the updated pixel values after a first number of updates to the pixel values stored in the secure memory, wherein two or more adjacent frames from the plurality of frames are to be compared to determine whether a sufficient difference exists between the two or more adjacent frames, wherein incrementing a counter value is to be: stopped in response to a determination that the sufficient difference is absent between the two or more adjacent frames, or resumed in response to a determination that the sufficient difference is present between the two or more adjacent frames, wherein the counter is to be compared with the first number to determine whether to allow access by the untrusted software to the updated pixel values.

12. The one or more computer-readable media of claim 11, further comprising one or more instructions that when executed on the at least one processor configure the at least one processor to perform one or more operations to cause the untrusted software to compensate for wear on a display panel based at least in part on the updated pixel values.

13. The one or more computer-readable media of claim 11, further comprising one or more instructions that when executed on the at least one processor configure the at least one processor to perform one or more operations to cause a display panel, coupled to the display controller logic, to display the plurality of frames, wherein the display panel is an Organic Light Emitting Diode (OLED) display panel.

14. The one or more computer-readable media of claim 11, further comprising one or more instructions that when executed on the at least one processor configure the at least one processor to perform one or more operations to cause the display controller logic circuitry to allow access by the untrusted software to the updated pixel values by causing the updated pixel values to be written to a software visible memory.

15. The one or more computer-readable media of claim 11, further comprising one or more instructions that when executed on the at least one processor configure the at least one processor to perform one or more operations to cause the display controller logic circuitry to updated the pixel values by accumulating the pixel values.

16. The one or more computer-readable media of claim 11, further comprising one or more instructions that when executed on the at least one processor configure the at least one processor to perform one or more operations to cause the secure memory to be inaccessible by the untrusted software.

17. The one or more computer-readable media of claim 11, further comprising one or more instructions that when executed on the at least one processor configure the at least one processor to perform one or more operations to cause security logic to provide the first number to the display logic circuitry.

18. A method comprising:
storing data that is only accessible by trusted logic in secure memory; and updating, at display controller logic circuitry, pixel values to be stored in the secure memory based on a plurality of frames,
wherein the display controller logic circuitry allows access by untrusted software to the updated pixel values after a first number of updates to the pixel values stored in the secure memory, wherein two or more adjacent frames from the plurality of frames are compared to determine whether a sufficient difference exists between the two or more adjacent frames, wherein incrementing a counter value is: stopped in response to a determination that the sufficient difference is absent between the two or more adjacent frames, or resumed in response to a determination that the sufficient difference is present between the two or more adjacent frames, wherein the counter is compared with the first number to determine whether to allow access by the untrusted software to the updated pixel values.

19. The method of claim 18, further comprising the untrusted software compensating for wear on a display panel based at least in part on the updated pixel values.

20. The method of claim 18, further comprising a display panel, coupled to the display controller logic, displaying the plurality of frames, wherein the display panel is an Organic Light Emitting Diode (OLED) display panel.

21. The method of claim 18, further comprising the display controller logic circuitry allowing access by the untrusted software to the updated pixel values by causing the updated pixel values to be written to a software visible memory.

22. The method of claim 18, further comprising the display controller logic circuitry updating the pixel values by accumulating the pixel values.

* * * * *